C. A. DE CEW AND W. F. HIRST.
HAND POWER DRIVEN BAND SAW.
APPLICATION FILED JAN. 6, 1920.
1,374,638.
Patented Apr. 12, 1921.
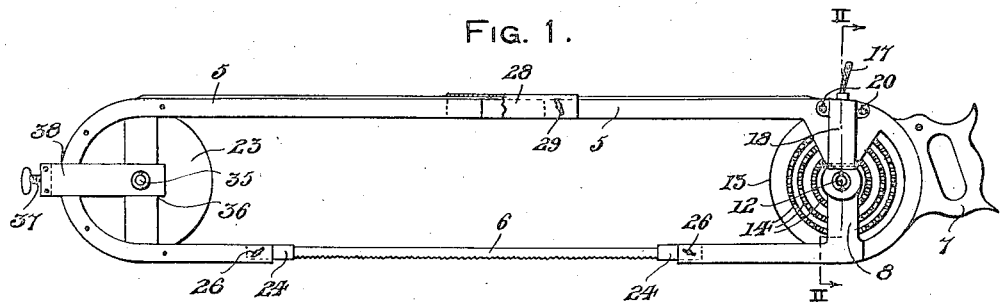
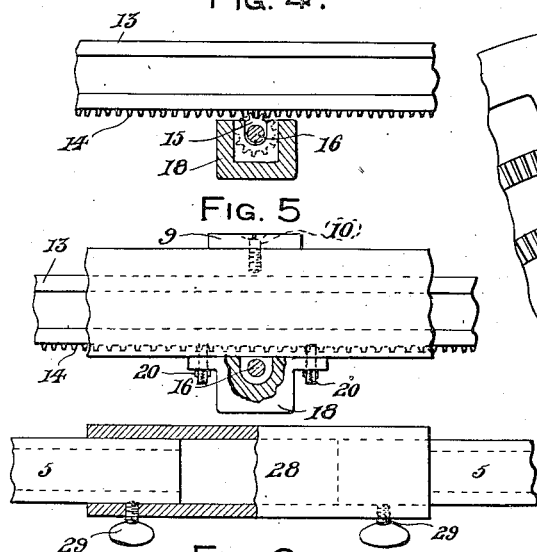
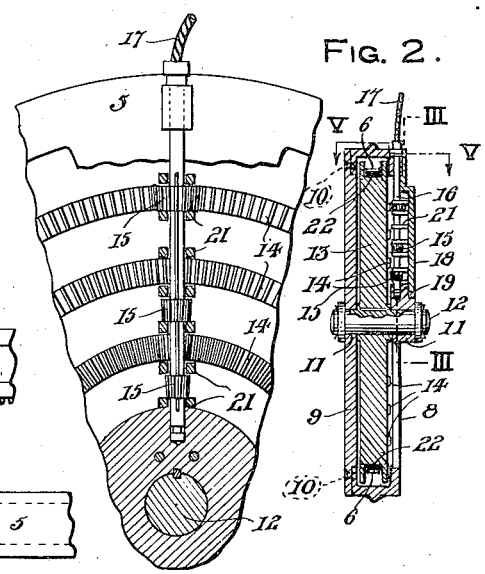
Inventors
C. A. De Cew
W. F. Hirst
By A. M. Wilson
Attorney.

# UNITED STATES PATENT OFFICE.

CHARLES A. DE CEW AND WILLIAM F. HIRST, OF CEDAR RAPIDS, IOWA.

HAND POWER-DRIVEN BAND-SAW.

1,374,638.   Specification of Letters Patent.   Patented Apr. 12, 1921.

Application filed January 6, 1920. Serial No. 349,750.

*To all whom it may concern:*

Be it known that we, CHARLES A. DE CEW and WILLIAM F. HIRST, citizens of the United States of America, residing at Cedar Rapids, in the county of Linn and State of Iowa, have invented certain new and useful Improvements in Hand Power-Driven Band-Saws, of which the following is a specification.

The principal object of the present invention is to provide a practical hand or manually guided power-driven band saw for carpenters, carriage workers, cabinet makers and butchers.

In carrying out the above object, we preferably construct the saw of a main frame, preferably substantially elliptical in form and composed of channel bar with pulleys at each end of the frame around which the band passes, one of the pulleys being provided with means to cause rotation thereof at various speeds as desired.

Other objects will become apparent as the nature of the invention is better understood which consists in the novel form, combination and arrangement of parts hereinafter more fully described, shown in the accompanying drawings and claimed.

In the drawings,

Figure 1 is a side elevational view of a saw constructed in accordance with the present invention, Fig. 2 is a sectional view thereof taken substantially upon line II—II of Fig. 1 and enlarged, Fig. 3 is a sectional fragmentary enlarged view taken substantially upon line III—III of Fig. 2 and showing the driving arrangement for obtaining different speeds, Fig. 4 is a view, partly in top plan and partly in transverse section and showing the grooved driven pulley and the guard for the driving gears, Fig. 5 is a view somewhat similar to Fig. 4 taken on line V—V of Fig. 2 and enlarged, Fig. 6 is a view partly in top plan and partly broken away and illustrating on an enlarged scale adjustable connection between the two parts of the main frame to provide for the use of various sized saw bands, Fig. 7 is a fragmentary plan view illustrating one of the guiding means for varying the angle of the cut relative to the plane of the saw frame, Fig. 8 is a perspective view of a modified form of saw guide, Fig. 9 is a perspective view of the guide shown in Fig. 7 and Fig. 10 illustrates an attachment shown in perspective and partly broken away, which may be attached to the present saw for guiding the same at any angle relative to the straight edge of a board or the like.

Referring more in detail to the several views, the present invention embodies a main frame 5 substantially elliptical in form and constructed of channel bar with the side flanges disposed inwardly so as to provide a shield for the saw band 6 to travel in. One side of the frame is cut away so as to expose the saw for cutting as clearly shown in Fig. 1. A handle 7 is rigidly fixed at one end of the frame to enable an operator to hold and guide the saw.

A cross head 8 is cast integral with or securely fixed to the frame near the handle end thereof and another cross head 9 is detachably fastened as by screws 10 to the opposite side of the frame, the two cross heads 8 and 9 being provided with central mating bearings 11 in which the stub shaft or axle 12 of the rear driven pulley 13 is rotatably mounted. The grooved band wheel or pulley 13 carries a series of concentric ring gears 14 at one side, each adapted to be selectively meshed with one of the series of pinions 15 which are slidably keyed to an upright shaft 16 so as to longitudinally slide on the latter.

The cross head 8 is provided with two bearings in which the shaft 16 is journaled, and a flexible shaft 17 is secured to the upper end of the shaft 16 and may extend to any suitable source of power such as the armature shaft of an electric motor so as to be driven by the latter.

The casing 18 incloses the gears 15 and is pivotally mounted as at 19 to swing downwardly for exposing said gears 15, the shield 18 being retained in its upward position as shown in Fig. 1 by any suitable means such as latches 20. A series of slotted transversely disposed walls or plates 21 are rigidly fastened in proper spaced relation within the shield 18 so as to extend inwardly and partially surround the shaft 16 above and below the gears 15. By this arrangement any gear desired may be held between a pair of plates 21 so as to mesh with one of the ring gears 14 while the other two gears 15 are held between pairs of the plates 21 out of mesh with the other two ring gears 14. This changing of the gears 15 may be readily effected by unlatching the shield 18 and swinging the same outwardly so that the operator has access to the gears 15 for sliding the latter along the shaft 16 to the proper desired position. Obviously, a different speed is obtained by driving the outermost ring gear 14 than is obtained by driving the intermediate ring gear or the smallest ring gear. In order to insure motion being transmitted to the saw band 6, a suitable frictional surface 22 is provided thereon at the base or bottom of the groove thereof. This frictional material may also be provided in the other groove pulley 23 provided at the opposite end of the frame.

The free ends of the main frame 5 that are formed by cutting said frame away as hereinbefore noted, each carries a suitable guide 24 so constructed and positioned as to direct the cutting edge of the band 6 in the desired direction. Obviously, if it were not for these guides, the cutting edge of the band 6 would be disposed at right angles to the plane of the saw and it is often desirable to have the same twisted as far as shown in Fig. 1 wherein the band 6 has its side faces disposed in the plane of the saw. The guides 24 may consist in a block of metal shaped as shown in Fig. 9 and slotted as at 25 for the passage of the saw therethrough and may be secured in the ends of the frame 5 by any suitable means such as a set screw 26. As shown in Figs. 7 and 9, the guides 24 may be provided with a pair of anti-friction rollers 27 arranged to engage the opposite sides of the band 6 to provide for the smooth running of the device.

It is often found desirable to employ larger or smaller sized saw bands in the device, and in order to enable this to be done, the frame 5 is preferably centrally severed as shown in Figs. 1 and 6 and the meeting ends caused thereby are adjustably connected as by means of a channel connector 28 within which the ends of the saw frame are fastened by suitable means such as set screws 29.

As shown in Fig. 10, a channel member 30 may be provided for attachment to the frame 5 in front of the pulley 13 and rearwardly of the rear guide 24, said channel member 30 having a cross bar 31 pivoted as at 32 thereto and provided with end members 33 adapted to engage the straight edge of a board or the like. When the channel member has been fastened to the frame by the set screws 34, the saw may be swung upon the pivot 32 at any desired angle relative to the longitudinal axis of the member 31 and the saw will thus be guided to make the desired angular cut.

The forward pulley 23 is suitably journaled upon a shaft 35 which is fastened in a frame 36 slidably mounted in the frame 5 so as to move a limited distance forwardly or rearwardly relative to the latter. A set screw 37 is threaded through the bail 38 of the frame 36 and bears upon the frame 5 so that forward movement of said frame 36 will ensue upon screwing of the set screw 37 inwardly so as to cause tightening of the band 6.

From the foregoing description, it is believed that the construction and operation as well as the advantages of the present invention will be readily understood by those skilled in the art.

While the form of the invention herein shown and described is what is believed to be the preferable embodiment thereof, it is nevertheless to be understood that minor changes may be made without departing from the spirit and scope of the invention as claimed.

What is claimed as new is:

1. A hand guided power-driven band saw comprising an elongated frame having pulleys rotatably mounted at the opposite ends thereof, an endless saw band passing around said pulleys, a driven shaft rotatably mounted radially of and adjacent to one side of one of said pulleys, a plurality of pinions slidably mounted for longitudinal movement upon said shaft, a plurality of ring gears carried by said side of said one pulley, and means to retain any desired one of said pinions in mesh with one of said ring gears and to retain the remaining pinions out of mesh with the remaining ring gears.

2. A hand guided power-driven band saw comprising an elongated frame having pulleys rotatably mounted at the opposite ends thereof, an endless saw band passing around said pulleys, a driven shaft rotatably mounted radially of and adjacent to one side of one of said pulleys, a plurality of pinions slidably mounted for longitudinal movement upon said shaft, a plurality of ring gears carried by said side of said one pulley, means to retain any desired one of said pinions in mesh with one of said ring gears and to retain the remaining pinions out of mesh with the remaining ring gears, said last named means comprising a gear shield movable to an open position and having inwardly extending slotted plates and arranged at opposite sides of said pinions.

In testimony whereof we affix our signatures.

CHARLES A. DE CEW.
WILLIAM F. HIRST.